United States Patent
Bringert et al.

(10) Patent No.: US 8,452,597 B2
(45) Date of Patent: May 28, 2013

(54) SYSTEMS AND METHODS FOR CONTINUAL SPEECH RECOGNITION AND DETECTION IN MOBILE COMPUTING DEVICES

(75) Inventors: Bjorn Erik Bringert, Bath (GB); Pawel Pietryka, London (GB); Peter John Hodgson, London (GB); Simon Tickner, Whitstable (GB); Henrique Penha, San Francisco, CA (US); Richard Zarek Cohen, London (GB); Luca Zanolin, London (GB); Dave Burke, Palo Alto, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 13/621,068

(22) Filed: Sep. 15, 2012

(65) Prior Publication Data
US 2013/0085755 A1   Apr. 4, 2013

Related U.S. Application Data

(60) Provisional application No. 61/542,074, filed on Sep. 30, 2011.

(51) Int. Cl.
 G10L 15/04   (2006.01)
 G10L 15/00   (2006.01)
 G10L 21/00   (2006.01)

(52) U.S. Cl.
 USPC ............................ 704/251; 704/275; 704/231

(58) Field of Classification Search
 USPC .................. 704/231–257, 270–276; 379/455
 See application file for complete search history.

(56) References Cited

U.S. PATENT DOCUMENTS

| | | | |
|---|---|---|---|
| 6,212,541 B1 * | 4/2001 | McAuliffe et al. | 718/100 |
| 6,539,358 B1 * | 3/2003 | Coon et al. | 704/275 |
| 8,296,142 B2 * | 10/2012 | Lloyd et al. | 704/257 |
| 2002/0193989 A1 * | 12/2002 | Geilhufe et al. | 704/208 |
| 2007/0026844 A1 * | 2/2007 | Watanabe | 455/412.1 |
| 2007/0192109 A1 * | 8/2007 | Likens et al. | 704/275 |
| 2011/0223893 A1 * | 9/2011 | Lau et al. | 455/414.1 |

FOREIGN PATENT DOCUMENTS

GB   2361149 A   10/2001

OTHER PUBLICATIONS

PCT International Search Report and Written Opinion, PCT International Application No. PCT/US2012/057576 dated Dec. 12, 2012.
Sensory Inc.: "Designing With Speech Recognition", Oct. 1, 2001, URL:http://www.sensoryinc.com/support/docs/80-0080-D.pdf, pp. 1-8.

* cited by examiner

*Primary Examiner* — Jesse Pullias
(74) *Attorney, Agent, or Firm* — McDonnell Boehnen Hulbert & Berghoff LLP

(57) ABSTRACT

The present application describes systems, articles of manufacture, and methods for continuous speech recognition for mobile computing devices. One embodiment includes determining whether a mobile computing device is receiving operating power from an external power source or a battery power source, and activating a trigger word detection subroutine in response to determining that the mobile computing device is receiving power from the external power source. In some embodiments, the trigger word detection subroutine operates continually while the mobile computing device is receiving power from the external power source. The trigger word detection subroutine includes determining whether a plurality of spoken words received via a microphone includes one or more trigger words, and in response to determining that the plurality of spoken words includes at least one trigger word, launching an application corresponding to the at least one trigger word included in the plurality of spoken words.

20 Claims, 5 Drawing Sheets

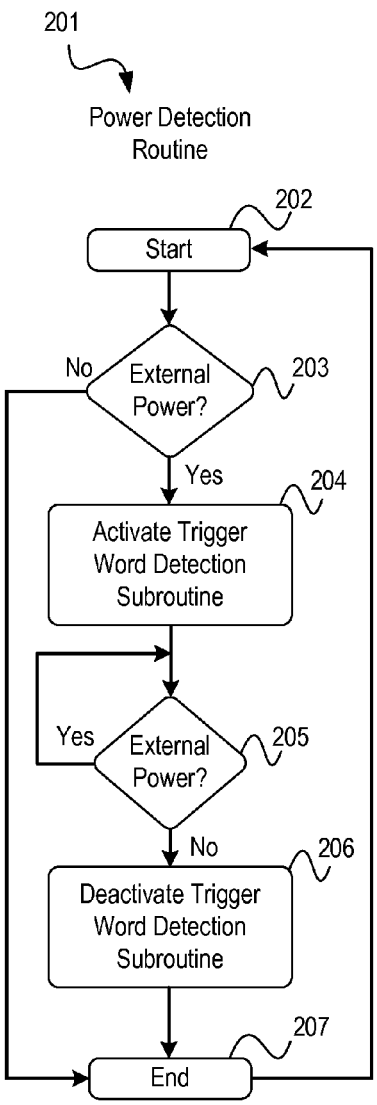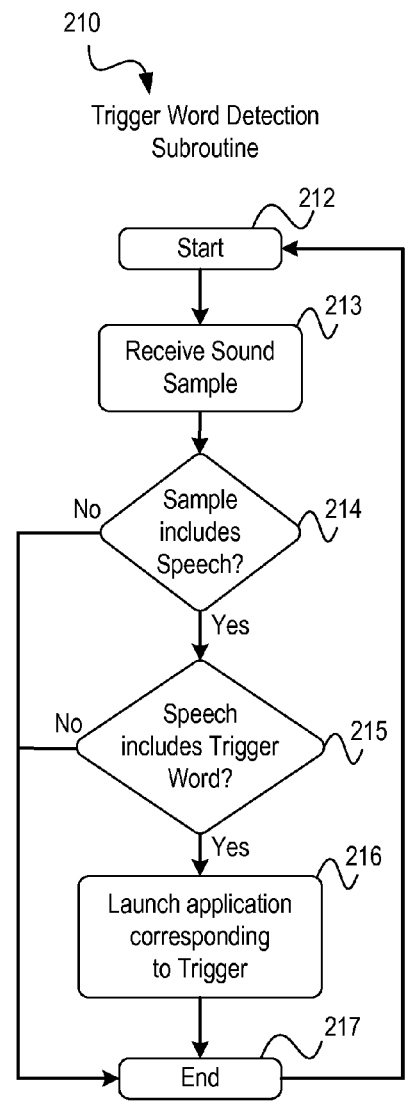
FIG. 2A
FIG. 2B

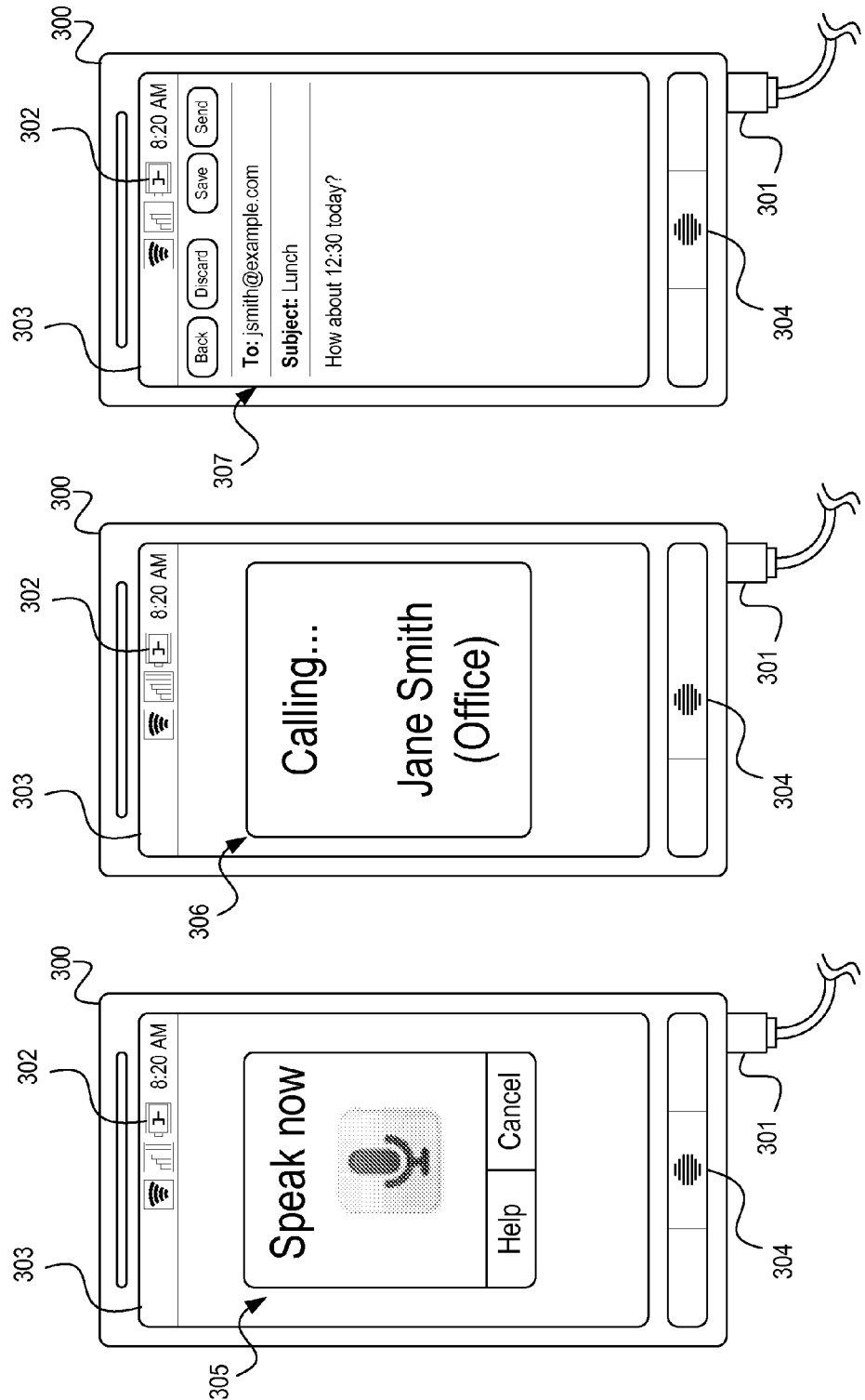

SYSTEMS AND METHODS FOR CONTINUAL SPEECH RECOGNITION AND DETECTION IN MOBILE COMPUTING DEVICES

CROSS-REFERENCE TO RELATED APPLICATIONS

This patent application claims priority to U.S. Provisional Application No. 61/542,074, filed on Sep. 30, 2011, the contents of which are entirely incorporated herein by reference, as if fully set forth in this application.

BACKGROUND

Typically, activating a voice command interface on a mobile computing device requires some physical activation of the voice command interface by a user. For example, to activate a voice command interface on a mobile computing device, a user may be required to press or hold a physical button or switch on the exterior of the mobile computing device, or the user may be required to activate a virtual button or switch on a graphical user interface associated with the mobile computing device.

SUMMARY

Controlling a mobile computing device via voice commands is often useful when a user cannot easily interact with the mobile computing device physically. For example, controlling a mobile computing device via voice commands can be useful when the user is driving a car or when the mobile computing device is some distance from the user (e.g., across the room or otherwise out of the user's immediate reach).

A voice command interface for controlling a mobile computing device generally requires operating a microphone or other speech input device to receive speech from a user, and running speech recognition and detection algorithms on the mobile computing device to detect and recognize speech received via the microphone. However, continually operating a microphone and continually running speech detection and recognition applications on a mobile computing device may be undesirable in many situations because the power required to operate the microphone and continually execute the detection and recognition applications can rapidly deplete the mobile computing device's battery.

The present application discloses systems and methods that allow a user to enjoy the advantages of controlling a mobile computing device via voice commands without the limitations of having to either press or hold a physical button or switch on the mobile computing device or manually activate a virtual button or switch on a graphical user interface of the mobile computing device as required with existing devices.

In operation, a mobile computing device according to some embodiments of the disclosed systems and methods is configured to (i) detect coupling to an external power source, and (ii) in response to the detecting, activate a speech recognition mode. Some embodiments include a power monitoring routine for detecting coupling to an external power source. Likewise, in some embodiments, a mobile computing device operating in a speech recognition mode may include a trigger word detection subroutine. The combination of detecting the coupling to the external power source and activating the speech recognition mode enables the disclosed embodiments to overcome the limitations of existing devices with negligible impact on the mobile computing device's battery in most situations.

Some embodiments include determining whether the mobile computing device is receiving operating power either from an external power source or from a battery. If the mobile computing device is receiving power from the external power source, then the mobile computing device activates a speech recognition mode. In some embodiments, the speech recognition mode includes a trigger word detection subroutine. The external power source may be a wall charger for the mobile computing device or a docking station for the mobile computing device, such as a desktop or car-based docking station. Some embodiments may also include exiting from the speech recognition mode (and/or perhaps deactivating trigger word detection subroutine) when the mobile computing device is receiving operating power from the battery.

In operation, the trigger word detection subroutine includes determining whether spoken words received via a microphone include at least one trigger word of a set of one or more trigger words. In response to determining that the spoken words include at least one trigger word, the trigger word detection subroutine launches an application corresponding to the at least one trigger word included in the spoken words. In some embodiments, the trigger word detection subroutine operates continually as long as the mobile computing device continues to receive power from the external power source.

In some embodiments, the launched application corresponding to the detected trigger word (or words) may be a voice command prompt configured to receive a voice command from a user. When the voice command prompt is launched, a user may control the mobile computing device via one or more voice commands. The voice command after the trigger word (or words) may include an action and an object of the action. For example, the trigger word to launch the voice command prompt application may be "Android," and the voice command may include "call" (action) and "Jane Smith" (the object of the action). The voice command could include additional words as described herein.

In other embodiments, the launched application may be a particular communications application, multimedia application, or an application for configuring settings of the mobile computing device. In these embodiments, the trigger word could even be the name of the application. For example, the trigger word to launch the phone dialer may be "call." In response to detecting the trigger word "call," the mobile computing device may be configured to launch the phone dialer and then either (i) wait to receive the name of the desired called party or (ii) use the words following the "call" trigger word as the name of the desired called party. The phone dialer (or other launched application) could be configured to receive additional voice commands after it is launched. The types of commands may vary depending on the particular application as described herein.

In some embodiments, the trigger word detection routine may be launched in response to coupling the device to the external power source and not in response to any other type of input (e.g., touch input, manual button press, etc.). In these embodiments, the speech recognition mode and/or trigger word detection routine may be activated automatically only when the mobile computing device is receiving power from an external power source. In some embodiments, the speech recognition mode may be activated only when the mobile computing device is receiving operating power from an external power source, and the speech recognition mode may always be deactivated when the mobile computing device is receiving operating power from a battery.

Other embodiments may include receiving a manual input from a user to activate (or deactivate) the trigger word detection subroutine regardless of whether the mobile computing device is receiving operating power from the external power source or the battery. In these embodiments, the mobile computing device may still activate a trigger word detection subroutine even though the mobile computing device may be receiving operating power from the battery. When the trigger word detection subroutine is manually activated by the user (e.g., touch input, manual button press, etc.), the trigger word detection subroutine may still operate continually while the mobile computing device is receiving power from the battery.

In some embodiments, the features and functions of the disclosed methods may be integrated with the operating system of the mobile computing device. In other embodiments, the features and functions of the disclosed embodiments may be components of an application that is installed and executed by the mobile computing device, such an application downloaded from an online application store.

Any of the methods described herein may be implemented in the form of instructions stored on a non-transitory, tangible computer readable media. When executed by a mobile computing device, the instructions may cause the mobile computing device to perform one or more functions of the disclosed method. Further examples may also include articles of manufacture including tangible, non-transitory computer-readable media that have computer-readable instructions encoded thereon. The instructions may comprise instructions to perform one or more functions of the methods described herein.

The computer readable media may include non-transitory computer readable media, such as computer-readable media that stores data for short periods of time like register memory, processor cache, and Random Access Memory (RAM). The computer readable media may also include non-transitory media, such as secondary or persistent long term storage, like read only memory (ROM), optical or magnetic disks, or compact-disc read only memory (CD-ROM), for example. The computer readable media may also be any other volatile or non-volatile storage system. In some embodiments, the computer readable media may be considered a computer readable storage media, for example, or a tangible storage media.

In addition, some aspects of the disclosed methods may be performed by circuitry configured to perform logical functions in any of the processes or methods described herein. In still further examples, many types of devices may be used or configured to perform logical functions in any of the processes or methods described herein. In yet further examples, many types of devices (and/or components or sub-components of the devices) may be used or configured as means for performing functions of any of the methods described herein (or any portions of the methods described herein).

BRIEF DESCRIPTION OF THE FIGURES

FIG. 2A shows an example algorithm for a power detection routine according to some embodiments.

FIG. 2B shows an example algorithm of a trigger word detection subroutine according to some embodiments.

FIGS. 3A-3C show examples of a mobile computing device 300 launching applications in response to detecting trigger words according to some embodiments.

DETAILED DESCRIPTION

The following detailed description includes references to the accompanying figures. In the figures, similar symbols typically identify similar components, unless context dictates otherwise. The example embodiments outlined in the detailed description, figures, and claims are not meant to be limiting. Other embodiments may be utilized, and other changes may be made, without departing from the scope of the subject matter presented herein. It will be readily understood that the aspects of the present disclosure, as generally described herein, and illustrated in the figures, can be arranged, substituted, combined, separated, and designed in a wide variety of different configurations, all of which are contemplated herein.

Figure 1:
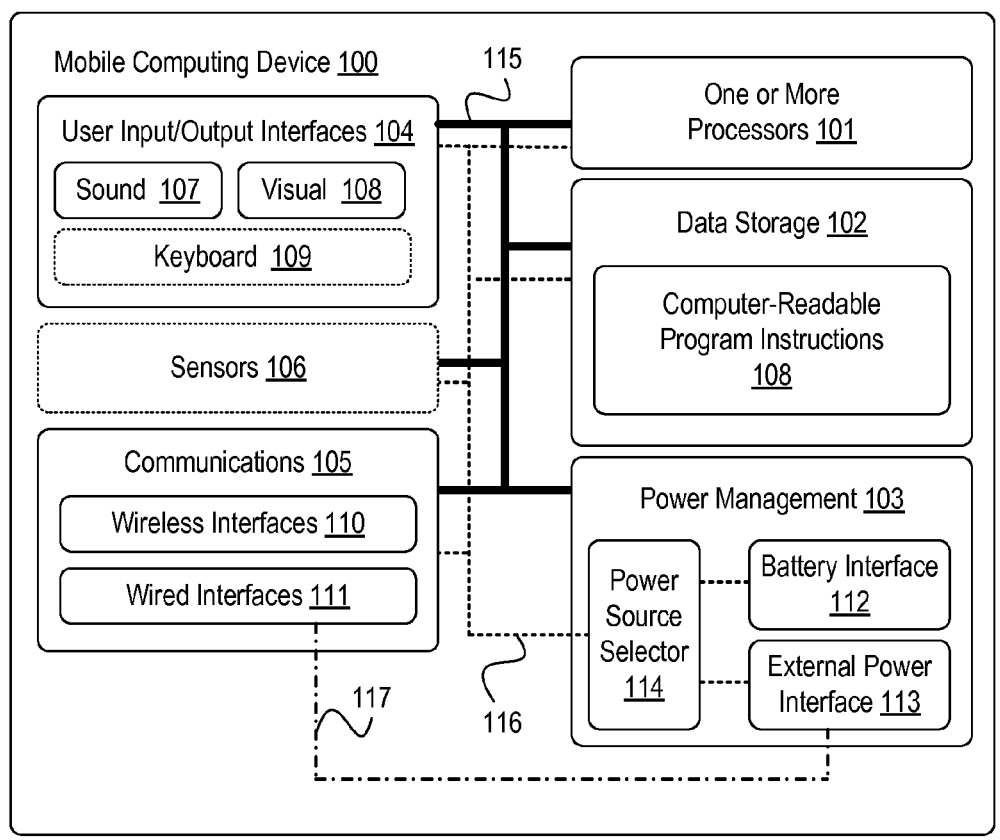
FIG. 1 shows an example of a simplified block diagram of a mobile computing device according to some embodiments.

FIG. 1 shows an example of a simplified block diagram of a mobile computing device 100 according to some embodiments. In some embodiments, the mobile computing device 100 may be a mobile telephone, cellular telephone, smartphone or similar mobile communications device now known or later developed that may be controlled via voice commands. In other embodiments, the mobile computing device 100 may be a laptop computer, tablet computer, or other type of mobile computing device now known or later developed that may be controlled via voice commands.

The mobile computing device 100 includes a plurality of components, such as one or more processors 101, data storage 102, power management sub-system 103, user input/output interfaces 104, communications interfaces 105, and sensors 106. The individual components are connected via one or more data busses 115 or similar communications connections that are configured to enable the individual components to send and receive data to and from other components of the mobile computing device 100. The individual components are also connected to the power management sub-system 103 via a power distribution bus 116 or similar connection that is configured to provide operating power to the individual components of the mobile computing device 100.

The one or more processors 101 may include any type of general purpose processor (e.g., processors from Intel, Advanced Micro Devices (AMD), etc.) or any type of special purpose processors (e.g., application specific integrated circuits (ASICs), digital signal processors (DSP), Coder/Decoders (CODECs), etc.) now known or later developed.

The data storage 102 is configured to store data as well as computer-readable program instructions 108. The data storage 102 may include any of the types of data storage described herein, including short term volatile memory (e.g., RAM) for storing data and/or program code or instructions during execution of the program code or instructions and/or longer-term non-volatile memory (e.g., ROM) for storing data and/or program code or instructions. In some embodiments, the data storage may be implemented as solid state and/or flash memory or other similar types of small form factor storage media.

The power management sub-system 103 includes a battery power interface 112, an external power interface 113, and a power source selector 114. The battery power interface 112 is configured to receive operating power from a battery source, such as an internal battery, a removable battery that is electrically coupled to the mobile computing device 100, or any other sort of battery or similar type of portable power supply now known or later developed. The battery that supplies operating power for the mobile computing device 100 via the battery interface 112 may be rechargeable or non-rechargeable.

The external power interface 113 is configured to receive power from an external power source for the mobile computing device 100. Examples of external power sources include electrical wall outlets, desktop docking stations, car docking stations or power cables, alarm clocks or entertainment systems with docking stations, or any other type of connection or device that is configured to provide the mobile computing device 100 with operating power so that the mobile computing device 100 does not need to rely on operating power from a battery via the battery interface 112.

In some embodiments, the power source selector 114 may be configured to selectively provide operating power from one of the battery interface 112 or the external power interface 113. In embodiments with rechargeable batteries, when an external power source is connected via the external power interface 113, the power source selector 114 may be configured to both (i) provide operating power to the mobile computing device 100 from the external power supply via the external power interface 113 and (ii) charge the battery with power from the external power supply by providing an electrical connection from the external power interface 113 to the battery interface 112.

The user input/output interfaces 104 include a plurality of input and output components, such as sound input/output components 107, display input/output components 108, and an optional keyboard 109. The sound components 107 may include a microphone or other similar type of sound detection device now known or later developed that is configured to detect and receive sound waves. The sound components 107 may also include one or more speakers or similar sound generation devices now known or later developed that are configured to generate sound waves.

The display input/output components 108 may include a Liquid Crystal Display (LCD), plasma display, or similar type of display device now known or later developed that is configured to display a graphical user interface and/or other information to a user. In some embodiments, the display 108 may include a touch-screen interface or other touch-sensitive components to enable a user to enter commands or other information (or otherwise interact with) the mobile computing device 100. In some embodiments, the display 108 may be configured to generate and display a virtual keyboard for data entry by a user. In other embodiments, the mobile computing device 100 may optionally include a physical keyboard 109. However, a keyboard (virtual or physical) is not required in all embodiments. Some embodiments may also include one or more external switches or buttons (not shown) to turn the mobile computing device 100 on or off, to wake the device from a sleep state, to control volume or other similar functions.

The communications interfaces 105 may include one or more wireless communications interfaces 110 and one or more wired interfaces 111. The wireless interfaces 110 may include any type of wireless communications interface configured to transmit and receive data according to any of a number of different wireless communications protocols, such as Bluetooth, IEEE 802.11 (IEEE 802.11 may refer to IEEE 802.11-2007, IEEE 802.11n-2009, or any other IEEE 802.11 revision) or other Wi-Fi variant, Code-Division Multiple Access (CDMA), Global System for Mobile Communications (GSM), 3rd Generation (3G), 4th Generation (4G), 3rd Generation Partnership Project—Long Term Evolution (3GPP-LTE), Worldwide Interoperability for Microwave Access (WiMAX), Zigbee, General Packet Radio Service (GPRS), Evolution-Data Optimized (EV-DO), High-Speed Downlink Packet Access (HSDPA), or any other type of wireless communications protocol now known or later developed. The wired interfaces 111 may include any type of wired communications interface (e.g., electrical, optical, etc.) configured to transmit and receive data according to any of a number of different communications protocols, such as Universal Serial Bus (USB), Ethernet, IEEE 1394, Firewire, Thunderbolt, or any other type of serial or parallel data communications protocol now known or later developed. The wired interfaces 110 and wireless interfaces 111 may be configured to communicate with other computing or communications devices via networks, e.g. the Internet, and/or communicate with peripheral devices, such as disk drives, external monitors, mouse or trackball/pad devices, and external keyboards etc., via Bluetooth, USB, or similar connections. In some examples, mobile computing device 100 may use wired interfaces 110 and/or wireless interfaces 111 to communicate with a server that performs speech recognition on behalf of mobile computing device 100.

In some embodiments, the wired communications interface 111 may also be configured to provide operating power via the external power interface 113 as shown by power connection 117 from the wired interface 111 to the external power interface 113. For example, USB is one type of wired communications interface that can be configured to provide both communications and power.

Some embodiments of the mobile computing device 100 may also include one or more sensors 106. The sensors 106 may include any one or more cameras or other image sensors, accelerometers, Global Positioning System (GPS) sensors, temperature sensors, or any other type of sensor known now or later developed that may be desirable to integrate with the mobile computing device 100.

As described briefly above, a mobile computing device configured according to the disclosed embodiments may enable a user to enjoy the advantages of controlling the mobile computing device via voice commands without the limitation of having to either press or hold a physical button or switch on the mobile computing device or manually activate a virtual button or switch on a graphical user interface of the mobile computing device. In one embodiment, the above-described advantages may be achieved via a combination of a power detection routine and a trigger word detection subroutine that are executed by the mobile computing device 100.

FIG. 2A shows an example algorithm for a power detection routine 201 according to some embodiments, and FIG. 2B shows an example algorithm for a trigger word detection subroutine 210 according to some embodiments. The description of the algorithms of FIGS. 2A and 2B includes references to the example mobile computing device 100 and its corresponding components shown and described herein with reference in FIG. 1. In some embodiments, the power detection routine 201 and/or the trigger word detection subroutine 210 may be components of the operating system of the mobile computing device 100. In other embodiments, the power detection routine 201 and/or the trigger word detection subroutine 210 may be components of an application or widget installed on the mobile computing device 100, such as an application or widget downloaded from an online application store.

In some embodiments, the power detection routine 201 may be configured to operate continually (or at least substantially continually) on the mobile computing device 100. Some embodiments may also allow a user to activate and deactivate the power detection routine 201. In some embodiments, the power detection routine 201 may be selectively activated or deactivated by a user.

In the embodiment of FIGS. 2A and 2B, the trigger word detection subroutine 210 is a "subroutine" of the power detection routine 201 in that the trigger word detection subroutine 210 is activated by the power detection routine 201 under certain conditions, as described herein. However, the trigger word detection capability need not be implemented as a subroutine of a power detection routine in all embodiments.

The power detection routine starts at block 202. At block 203, the power detection routine 201 determines whether operating power for the mobile computing device 100 is being received from either (1) an external power source via the external power interface 113 or (2) a battery power source via the battery interface 112. In some embodiments, the determination may be made by the power source selector 114. In other embodiments, the determination may be made by one or more processors 101 configured to monitor any of the battery interface 112, the external power interface 113, and/or the power source selector 114. If an external power source is not detected (i.e., the mobile computing device 100 is receiving operating power from a battery source), then the power detection routine 201 ends at block 207. After ending at block 207, power detection routine 201 re-starts at block 202, either immediately (or after a brief waiting period) so that power detection routine 201 operates continually (or at least substantially continually).

However, if at block 203, the power detection routine 201 determines that the mobile computing device 100 is receiving operating power from an external power source via the external power interface 113, then the power detection routine 201 advances to block 204. At block 204, the power detection routine 201 activates the trigger word detection subroutine 210. Once it is activated by the power detection routine 201 at block 204, the trigger word detection subroutine 210 may be configured to execute continually (or at least substantially continually) until it is deactivated.

After activating the trigger word detection subroutine 210 at block 204, the power detection routine advances to block 205. At block 205, the power detection routine 201 determines whether the communications device 100 is receiving operating power from an external power source via the external power interface 113. In some embodiments, the determination may be made by the power source selector 114. In other embodiments, the determination may be made by one or more processors 101 configured to monitor any of the battery interface 112, the external power interface 113, and/or the power source selector 114.

If the mobile computing device 100 is receiving its operating power from an external power source, then the power detection routine 201 returns to block 205. But if the power detection routine 201 determines that the mobile computing device 100 is no longer receiving its operating power from an external power source (i.e., the external power source has been disconnected from the external power interface 113 and/or the mobile computing device 100 has switched to battery power), then the power detection algorithm 201 advances to block 206. At block 206, the power detection routine 201 deactivates the trigger word detection subroutine 210. The power detection routine 201 then ends at block 207. After ending at block 207, power detection routine 201 re-starts at block 202, either immediately (or after a brief waiting period) so that power detection routine 201 operates continually (or at least substantially continually).

FIG. 2B shows an example algorithm of a trigger word detection subroutine 210. As described with respect to FIG. 2A, once the power detection routine 201 activates the trigger word detection subroutine 210 at block 204, the trigger word detection subroutine 210 is configured to execute continually (or at least substantially continually) until it is deactivated. The trigger word detection subroutine 210 may be deactivated by the power detection routine 201 at block 206 as described above. In some embodiments, the trigger word detection subroutine 210 may be selectively activated and/or deactivated by a user.

The trigger word detection subroutine 210 starts at block 212. At block 213, the trigger word detection subroutine receives a sound sample. The sound sample may be received via the sound input 107 of the mobile computing device 100. In some embodiments, the sound input 107 may include a microphone or other type of sound input or detection device. Some embodiments may include a sound detector that triggers the activation of a microphone. Once activated, the microphone captures a sound sample. In other embodiments, a microphone may be configured to continually (or at least substantially continually) capture sound samples once the trigger word detection subroutine 210 has been activated.

At block 214, the trigger word detection subroutine 210 determines whether the sound sample received at block 213 includes speech. Determining whether the sound sample includes speech can be accomplished by any of a number of speech detection algorithms now know or later developed. In some embodiments, the speech detection algorithm may be executed by the one or more processors 101. In other embodiments, the speech detection algorithm may be executed by one or more components of the sound input 107.

If the sound sample does not include speech, then the trigger word detection subroutine 210 ends at block 217 and, thereafter, re-starts at block 212 (either immediately or after a brief waiting period) to receive an additional sound sample at block 213. However, if the sound sample includes speech, then the trigger word detection subroutine 210 advances to block 215.

At block 215, the speech from the sound sample is analyzed to determine whether the speech includes at least one of a set of one or more trigger words. Trigger words are described in more detail with respect to FIGS. 3A-3C. The sound sample may be analyzed with any of a number of sound or voice recognition algorithms now known or later developed. For example, speech recognition may be performed on the spoken input to obtain text, and the text may be analyzed to determine whether the text includes one or more trigger words. The speech recognition may be performed by the mobile computing device 100, by a server with which mobile computing device 100 communicates, or by a combination thereof.

If the speech does not includes at least one trigger word, then the trigger word detection subroutine ends at block 217 and, thereafter, re-starts at block 212 (either immediately or after a brief waiting period) to receive an additional sound sample at block 213. However, if the received speech includes at least one trigger word, then the trigger word detection subroutine advances to block 216. At block 216, the trigger word detection subroutine 210 launches an application corresponding to the at least one trigger word determined at block 215. After launching the application at block 216, the trigger word detection subroutine 210 ends at block 217. After ending at block 217, the trigger word detection subroutine 210 re-starts at block 212 (either immediately or after a brief waiting period) to receive a new sound sample at block 213.

As described above, the trigger word detection subroutine 210 continues in this manner continually (or at least substantially continually) until the trigger word detection subroutine 210 is deactivated by either the power detection routine 201 or a user.

FIGS. 3A-3C show examples of a mobile computing device 300 launching applications in response to detecting trigger words according to some embodiments. The mobile computing device 300 may be similar to the mobile computing device 100 shown and described with respect to FIG. 1. Similarly, the mobile computing device 300 may be configured to execute the power detection routine 201 and/or the trigger word detection subroutine 210 shown and described with respect to FIGS. 2A-2B.

In FIGS. 3A-3C, the mobile computing device 300 is receiving operating power from an external power source connected to the mobile computing device 300 via cable 301. Power icon 302 on the display 303 of the mobile computing device 300 indicates that the mobile computing device 300 is receiving power from an external power source. Because the mobile computing device 300 is receiving operating power from an external power source, the power detection routine 201 (FIG. 2A) will have activated the trigger word detection subroutine 210 (FIG. 2B). As described herein, once activated, the trigger word detection subroutine 210 is configured to operate continually (or at least substantially continually) until it is deactivated by either the power detection routine 201 or a user.

While activated, the trigger word detection subroutine 210 is receiving sound samples via the microphone 304 of the mobile computing device 300. When the mobile computing device 300 determines that a sound sample received via its microphone 304 includes at least one trigger word of a set of one or more trigger words, the mobile computing device 300 is configured to launch an application corresponding to the at least one determined trigger word.

In some embodiments, the mobile computing device 300 may be configured to detect a single trigger word. For example, the trigger word may be "Android" (or perhaps some other user-defined trigger word or group of words). In operation, when the mobile computing device 300 detects the trigger word (or group of words), the mobile computing device may launch a voice command prompt. FIG. 3A shows an example of the mobile computing device 300 launching a voice command prompt 305 in response to detecting a trigger word corresponding to the voice command prompt 305.

After the voice command prompt 305 has been launched, a user can then issue a spoken command string to the mobile computing device 300. For example, the spoken command string may be "Call . . . Jane Smith . . . Office." Here, the command includes an action ("call"), an object of the action ("Jane Smith"), and a parameter ("Office"). In response to receiving the spoken command string, the mobile computing device 300 may (i) launch an application corresponding to the action (and possibly one or more parameters associated with the action), and (ii) execute the application based on the object of the action (and possibly one or more parameters associated with the object of the action). FIG. 3B shows the mobile computing device 300 launching a phone application 306 and calling "Jane Smith" at her office number in response to the spoken command string received via the voice command prompt 305 (FIG. 3A).

In other embodiments, the mobile computing device 300 may be configured to launch other types of applications in response to particular spoken command strings received via the voice command prompt 305. In one example, the mobile computing device 300 may be configured to activate or deactivate a particular application, feature, or service. For example, the mobile computing device 300 may be configured to silence or deactivate its ringer in response to the command string such as "Configuration Ringer Silent." In another example, the mobile computing device 300 may be configured to launch a multimedia player and play a particular song or video in response to a spoken command string received via the voice command prompt 305. For example, the spoken command string "Play Song All You Need Is Love" may cause the mobile computing device 300 to launch a multimedia player and play the song "All You Need Is Love" by The Beatles.

As described above, the spoken command string may include one or more parameters associated with either an action or an object to ameliorate or otherwise minimize ambiguity. In the example shown in the FIG. 3B, the "call" was the action, "Jane Smith" was the object, and "Office" was the parameter associated with object "Jane Smith." The parameter "Office" specifies which of Jane Smith's numbers to call (i.e., home, office, mobile, etc.).

In the foregoing example, the trigger word was "Android" and the command string was "Call Jane Smith Office." In some embodiments, the user may need to pause slightly after the trigger word before speaking a command string to allow time for the mobile computing device 300 to launch the voice command prompt 305. Similarly, the user may need to pause slightly after speaking the "action" for the voice command prompt to allow time for the mobile computing device 300 to launch the application corresponding to the action, e.g., the phone application in this example.

However, in other embodiments, the mobile computing device 300 may be configured to cache a brief history of spoken words, e.g., up to about 5-30 seconds of spoken words or perhaps a configurable number of words, e.g., up to 10-20 spoken words, depending on the configuration. In embodiments that cache a brief history of spoken words, the computing device 300 may be configured to analyze the words in the cache to identify actions, objects, and parameters that may follow a trigger word (or words). One advantage of caching a brief history of spoken words is that a user may not need to pause long (or at all) after a trigger word or after an "action" to wait for the mobile computing device 300 to launch the voice command prompt in response to the trigger word or to launch an application in response to the "action" received via the voice command prompt.

In some embodiments, the mobile computing device 300 may be configured to detect multiple trigger words (or groups of words, i.e., a trigger phrase), where individual trigger words (or phrases) correspond to different applications or actions to take in a particular application. In the previous example, a single trigger word (or perhaps trigger phrase), such as "Android" for example, caused the mobile computing device 300 to launch a voice command prompt 305 (FIG. 3A). Once the voice command prompt 305 was launched, the mobile computing device 300 could receive spoken command strings to launch other applications (i.e., a phone application as shown in FIG. 3B). But in embodiments where the mobile computing device 300 is configured to detect multiple trigger words (or sets of trigger words or phrases), the mobile computing device 300 may be able to launch applications and process commands faster than embodiments that may rely on a single trigger word to first open a voice command prompt 305 before receiving spoken command strings to launch applications.

In some embodiments, the set of trigger words may include a specific trigger word (or words) for a voice command prompt, a specific trigger word (or words) for a phone application, a specific trigger word (or words) for a text messaging application, a specific trigger word (or words) for an email application, and a specific trigger word (or words) for a multimedia player application, etc. In operation, the mobile computing device 300 could have many different trigger words or phrases corresponding to many different applications and/or functions. In some embodiments, a user may be able to configure or customize particular trigger words of phrases and associate those customize trigger words or phrases with particular applications or other computing, communications, or entertainment tasks. For example, a user may configure a trigger phrase "Favorite Song" to cause the mobile computing device to launch a multimedia player and play the song "All You Need Is Love" by The Beatles.

Although FIG. 3B was described above with respect to launching a telephone application in response to a spoken command string received via a voice command prompt, FIG. 3B can also correspond to an example of the mobile computing device 300 launching a telephone application in response to detecting a trigger word corresponding to the telephone application. For example, the trigger word corresponding to the phone application may be "call." When the mobile computing device 300 detects the trigger word "call," the mobile computing device may launch the phone application and then listen for further instructions, such as the number or person to call.

FIG. 3C shows an example of the mobile computing device 300 launching an email application 307 in response to detecting a trigger word corresponding to the email application 307. In this example, the trigger word corresponding to the email application 307 may be "mail," and upon detecting the "mail" trigger word, the mobile computing device 300 may launch the email application 307 and then listen for further instructions, such as the recipient, subject, and body of the email message.

Figure 4:
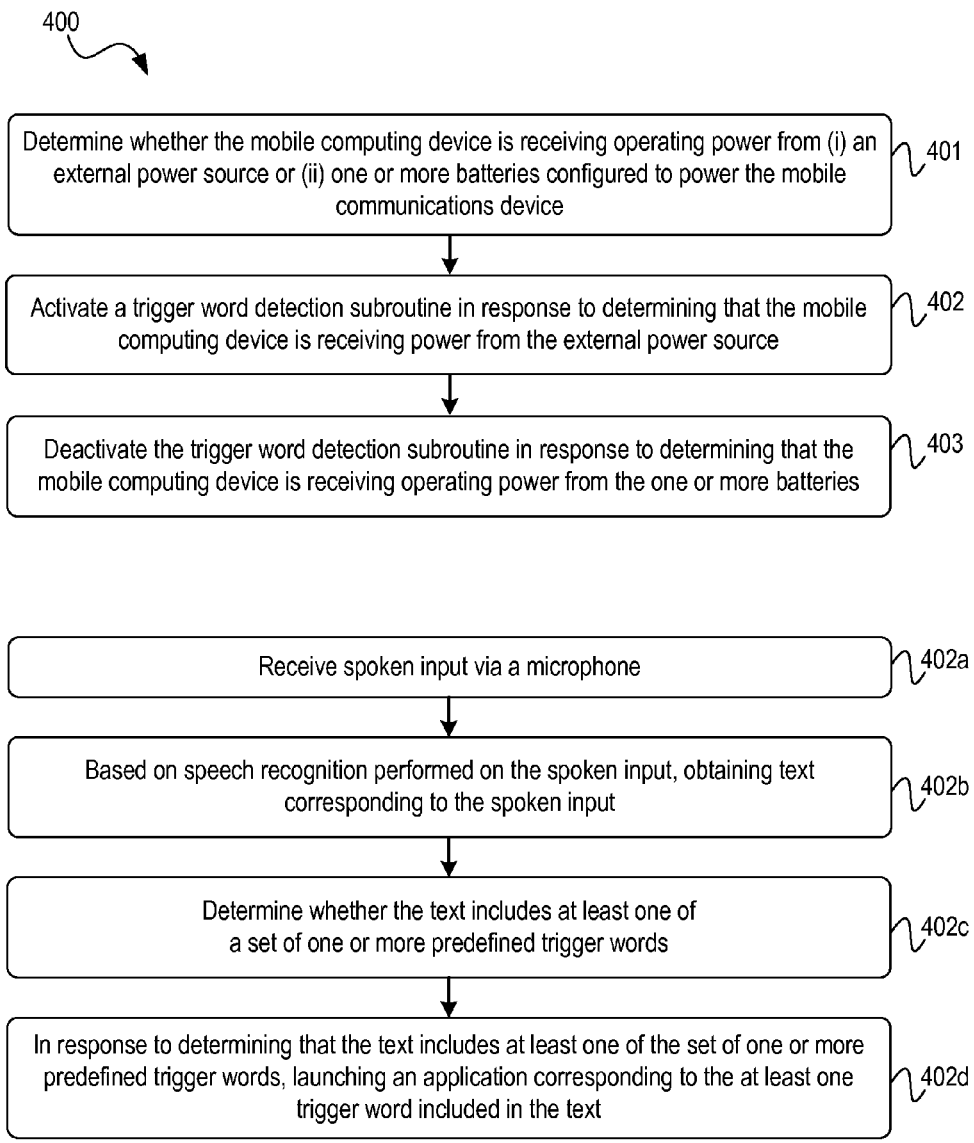
FIG. 4 shows an example method according to some embodiments.

FIG. 4 shows an example method 400 according to some embodiments. The method 400 begins at block 401, where a mobile computing device determines whether it is receiving operating power from one of (i) an external power source or (ii) one or more batteries configured to power the mobile computing device. The mobile computing device may be similar to any of the mobile computing devices described elsewhere herein. In this example, the mobile device includes a trigger word detection subroutine that is activatable by a user input and automatically in response to determining that the mobile computing device is receiving external power.

At block 402, the mobile computing device activates the trigger word detection subroutine in response to determining that it is receiving power from the external power source. The trigger word detection subroutine is shown in blocks 402a-402d, which are described in more detail below. In some embodiments, the mobile computing device may additionally or alternatively activate the trigger word detection subroutine in response to receiving an input from a user to activate the trigger word detection subroutine even when the mobile computing device is receiving power from the one or more batteries.

At block 403, the mobile computing device deactivates the trigger word detection subroutine in response to determining that it is receiving operating power from the one or more batteries. In some embodiments, the mobile computing device may additionally or alternatively deactivate the trigger word detection subroutine in response to receiving an input from a user to deactivate the trigger word detection subroutine even when the mobile computing device is receiving power from an external power source.

The trigger word detection subroutine is shown in blocks 402a-402d. In operation, once activated, the trigger word detection subroutine may be configured to execute continually (or at least substantially continually) until it is deactivated either at step 403 or by a user.

The trigger word detection subroutine begins at block 402a where the mobile computing device receives spoken input via a microphone. At block 402b, the mobile computing device obtains text corresponding to the spoken input, based on speech recognition performed on the spoken input. The speech recognition could be performed by the mobile computing device. Alternatively, the speech recognition could be performed, in whole or in part, by one or more devices external to the mobile computing device. For example, the mobile computing device may transmit the spoken input to a server, the server may perform speech recognition on the spoken input to determine a corresponding text, and the mobile computing device may obtain the text from the server.

At block 402c, the mobile computing device analyzes the text to determine whether the text includes at least one of a set of one or more predefined trigger words. At block 402d, in response to determining that the text includes at least one of the set of one or more predefined trigger words, the mobile computing device launches an application corresponding to the at least one trigger word included in the text.

In some embodiments, the application corresponding to the at least one trigger word may be a voice command prompt application configured to receive a voice command from a user. The voice command may comprise one or more of (i) an action, (ii) an object of the action, and (iii) one or more parameters associated with the action or the object. The voice command prompt and the voice commands received via the voice command prompt may be similar to the voice command prompts and voice commands described elsewhere herein.

In further embodiments, the application corresponding to the at least one trigger word may be any of a voice command prompt, a communications application, a multimedia application, or an application for configuring settings of the mobile computing device.

Figure 5:
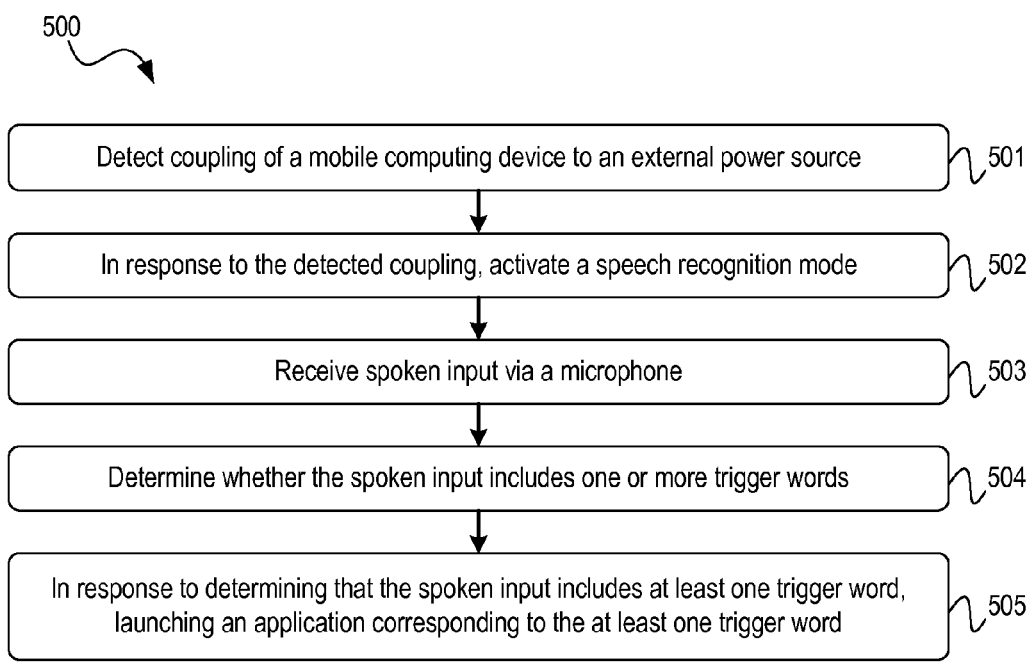
FIG. 5 shows an example method according to some embodiments.

In some embodiments, a speech recognition mode of a mobile computing device can be activated by coupling the mobile computing device to an external power source. FIG. 5 shows an example method 500 according to such embodiments. The method 500 begins at block 501, when a mobile computing device detects coupling of the mobile computing device to an external power source. In response to the detected coupling, the mobile computing device activates a speech recognition mode, at block 502. Blocks 502-505 describe an example of how the speech recognition mode may operate after being activated.

At block 503, the mobile computing device receives spoken input via a microphone. At block 504, the mobile computing device determines whether the spoken input includes one or more trigger words. This can involve speech recognition performed by the mobile computing device and/or by a server, as described above. In response to determining that the spoken input includes at least one trigger word, the mobile computing device launches an application corresponding to the at least one trigger word, at block 505.

While various aspects and embodiments have been disclosed herein, other aspects and embodiments will be apparent to those skilled in the art. The various aspects and embodiments disclosed herein are for purposes of illustration only and are not intended to be limiting, with the true scope and spirit being indicated by the following claims.

What is claimed is:

1. A method comprising:
   determining whether a mobile computing device is receiving operating power from an external power source, wherein the mobile computing device has a trigger word detection subroutine that is activatable by a user input and automatically in response to determining that the mobile computing device is receiving external power; and
   in response to determining that the mobile computing device is receiving operating power from the external power source, activating a trigger word detection subroutine, wherein the trigger word detection subroutine includes:
receiving spoken input via a microphone of the mobile computing device,
based on speech recognition performed on the spoken input, obtaining text,
determining whether the text includes one or more trigger words associated with a voice command prompt application, and
in response to determining that the text includes the one or more trigger words associated with the voice command prompt application, launching the voice command prompt application, wherein the voice command prompt application is configured to receive via the microphone additional spoken input that causes the mobile computing device to launch one or more other applications, and wherein launching the voice command prompt application comprises displaying a voice command prompt on the mobile computing device.

2. The method of claim 1, further comprising:
executing the trigger word detection routine continually until it is deactivated.

3. The method of claim 1, further comprising:
deactivating the trigger word detection subroutine in response to determining that the mobile computing device is receiving operating power from one or more batteries.

4. The method of claim 1, further comprising:
receiving the user input; and
activating the trigger word detection subroutine in response to receiving the user input regardless of whether the mobile computing device is receiving operating power from the external power source.

5. The method of claim 1, wherein the one or more other applications include at least one of a communications application, a multimedia application, or an application for configuring settings of the mobile computing device.

6. The method of claim 1, wherein the external power source is one of a charger associated with the mobile computing device and a docking station for the mobile computing device.

7. The method of claim 1, wherein one or more of the determining step, the activating step, and the trigger word detection subroutine are components of a mobile computing device operating system.

8. The method of claim 1, further comprising:
after launching the voice command prompt application, receiving a spoken command string via the microphone, wherein the spoken command string includes an action and an object of the action; and
in response to receiving the spoken command string, launching on the mobile computing device an application corresponding to at least the action and executing on the mobile computing device the application based on at least the object of the action.

9. The method of claim 8, wherein the spoken command string further includes one or more parameters associated with the action, and wherein launching on the mobile computing device an application corresponding to at least the action comprises launching on the mobile computing device an application corresponding to the action and the one or more parameters associated with the action.

10. The method of claim 8, wherein the spoken command string further includes one or more parameters associated with the object of the action, and wherein executing on the mobile computing device the application based on at least the object of the action comprises executing on the mobile computing device the application based on the object of the action and the one or more parameters associated with the object of the action.

11. A mobile computing device comprising:
a sound detector;
a display;
a power selector configured to selectively power the mobile computing device from one of either an external power source or one or more batteries; and
one or more processors configured to continually execute a trigger word detection subroutine when the power selector is powering the mobile computing device from the external power source and halt execution of the trigger word detection subroutine when the power selector is powering the mobile computing device from the one or more batteries, wherein the trigger word detection subroutine comprises determining whether spoken input received via the sound detector includes one or more trigger words associated with a voice command prompt application, and in response to determining that the spoken input includes the one or more trigger words associated with the voice command prompt application, launching the voice command prompt application, wherein the voice command prompt application is configured to receive via the sound detector additional spoken input that causes the mobile computing device to launch one or more other applications, and wherein launching the voice command prompt application comprises displaying a voice command prompt on the display.

12. The mobile computing device of claim 11, further comprising:
a user interface configured to receive an input from a user to activate the trigger word detection subroutine when the power selector is powering the mobile computing device from the one or more batteries.

13. The mobile computing device of claim 11, wherein the one or more other applications include at least one of a communications application, a multimedia application, or an application for configuring settings of the mobile computing device.

14. The mobile computing device of claim 11, wherein the one or more processors are further configured to, in response to the additional spoken input including an action and an object of the action, launch an application corresponding to at least the action and execute the application based on at least the object of the action.

15. The mobile computing device of claim 14, wherein the additional spoken input further includes one or more parameters associated with the action, and wherein launching an application corresponding to at least the action comprises launching an application corresponding to the action and the one or more parameters associated with the action.

16. The mobile computing device of claim 14, wherein the additional spoken input further includes one or more parameters associated with the object of the action, and wherein executing the application based on at least the object of the action comprises executing on the mobile computing device the application based on the object of the action and the one or more parameters associated with the object of the action.

17. A non-transitory computer readable medium having stored therein executable instructions that, when executed by a computing device having at least one processor, causes the computing device to perform functions comprising:

determining whether a mobile computing device is receiving operating power from either an external power source or an internal battery source; and activating a trigger word detection subroutine in response to determining that the mobile computing device is receiving power from the external power source, wherein the trigger word detection subroutine comprises continually determining whether spoken input received via a microphone includes one or more trigger words associated with a voice command prompt application and, in response to determining that the spoken input includes the one or more trigger words associated with the voice command prompt application, launching the voice command prompt application, wherein the voice command prompt application is configured to receive via the microphone additional spoken input that causes the mobile computing device to launch one or more other applications, and wherein launching the voice command prompt application comprises displaying a voice command prompt on the mobile computing device.

18. The non-transitory computer readable medium of claim 17, wherein the functions further comprise:

deactivating the trigger word detection subroutine in response to determining that the mobile computing device is receiving operating power from the internal battery source.

19. The non-transitory computer readable medium of claim 17, wherein the functions further comprise:

receiving a user input; and in response to receiving the user input, activating the trigger word detection subroutine regardless of whether the mobile computing device is receiving operating power from the external power source or the internal battery source.

20. The non-transitory computer readable medium of claim 17, wherein the functions further comprise, in response to the additional spoken input including an action and an object of the action, launching an application corresponding to at least the action and executing the application based on at least the object of the action.

* * * * *